United States Patent
Woodard

(10) Patent No.: US 8,195,699 B1
(45) Date of Patent: Jun. 5, 2012

(54) METHOD AND SYSTEM FOR GENERATING REAL-TIME SIMULATOR DATABASE FROM A PLURALITY OF INPUT FORMATS

(75) Inventor: Timothy A. Woodard, Syracuse, NY (US)

(73) Assignee: Diamond Visionics, LLC, Vestal, NY (US)

( * ) Notice: Subject to any disclaimer, the term of this patent is extended or adjusted under 35 U.S.C. 154(b) by 168 days.

(21) Appl. No.: 12/627,402

(22) Filed: Nov. 30, 2009

Related U.S. Application Data

(60) Provisional application No. 61/118,795, filed on Dec. 1, 2008.

(51) Int. Cl.
*G06F 17/30* (2006.01)
*G06F 7/00* (2006.01)

(52) U.S. Cl. ........................ 707/793; 707/803
(58) Field of Classification Search .................. 707/793, 707/803
See application file for complete search history.

(56) References Cited

U.S. PATENT DOCUMENTS

| | | | |
|---|---|---|---|
| 7,366,736 B1 | 4/2008 | Woodard | |
| 7,603,375 B2 * | 10/2009 | Ng et al. ............................... | 1/1 |
| 2011/0212717 A1 * | 9/2011 | Rhoads et al. ................. | 455/420 |
| 2011/0244919 A1 * | 10/2011 | Aller et al. .................. | 455/556.1 |

OTHER PUBLICATIONS

Method and System for Generating Real-Time Simulator Database From a Plurality of Input Formats.

\* cited by examiner

*Primary Examiner* — Kuen Lu
(74) *Attorney, Agent, or Firm* — Malin Haley DiMaggio Bowen & Lhota, P.A.

(57) ABSTRACT

A method and system to provide visualization of high resolution terrain for use in real-time simulation for digital image displays that is derived directly from source data including imagery, classification, elevation and vector data at run-time with little or no off-line manipulation of the source data. The fidelity of the visualization is scaled while based on the graphic system's capability readily available worldwide data exists for elevation vector and import runway data. System provides for facilitating run-time processing of source data utilizing a project file which lists each source file, desired attribute mapping and whether the source is enabled or disabled. For each source file a source proxy object is created in memory which references the target source file. The source proxy objects are stored in a vector manager in a spatial index to quickly determine which data sources intersect a given area. A spatial index can be queried for the proxies covering a requested geographical location. The resulting proxies are then accessed for the data within the query boundary. The system determines how attributes should be mapped from the source into what the internal algorithms need to process the data. The system defines how the data can be processed using a plurality of filter chains with a terminating filter which produces a result which is added to the scene imagery.

2 Claims, 5 Drawing Sheets

METHOD AND SYSTEM FOR GENERATING REAL-TIME SIMULATOR DATABASE FROM A PLURALITY OF INPUT FORMATS

BACKGROUND OF THE INVENTION

1. Field of the Invention

This invention relates generally to real-time simulator image display including earth terrain simulation and, more specifically, to a method and system for generating databases used in real-time image displays including real-time simulators that is configurable to receive data input in any format.

2. Description of Related Art

Real-time geo-specific terrain visualization has become an increasingly important requirement for military as well as commercial simulation endeavors. It is critical to be able to quickly generate accurate, realistic terrain databases for battlefield and flight simulators in real time. During offensive operations, the military may use these simulators to plan and create the sequences of events that occur during a mission before an actual battle. Also, flight training for commercial and military pilots is significantly improved when simulators have updated information concerning the area where the pilots actually fly and the airfields where they take off and land.

Traditionally, these terrain databases are generated manually using a visual database design system (VDBDS). The person utilizing the VDBDS must specify the input data sources including satellite and aerial imagery, digital elevation data, vector shapes used to define roads, rivers and other boundaries, and 3-D models of buildings and other ground features. This process is quite costly and time consuming. Once the input sources have been identified, the database modeler must then configure numerous VDBDS options that control how the input data will be processed and ultimately define the fidelity of the output database. The database modeler must ensure an appropriate balance between fidelity and performance such that the target simulation platform can process the database in real-time. Once the VDBDS has been configured, it must then process all of the input sources by combining them into merged database with the modeler-specified characteristics. The merged database contains polygons and texture in varying levels of detail (LODs). The visual simulation system loads and utilizes this merged database at run-time through a process generally known as "database paging". Patented examples of this approach include SmartMesh™ developed by Terrain Experts and ROAM (Real-time Optimally Adaptive Mesh) developed by The University of California.

There are numerous significant drawbacks with the above approach. The processing time required by a typical VDBDS to produce a large area database can be on the order of days or weeks, requiring dedicated CPU resources and resulting in databases that require far more disk space than the source data they are produced from. If new data becomes available (e.g. updated aerial imagery of a target area collected by a reconnaissance mission) then the database modeler must reconfigure the VDBDS to utilize the new data. Once reconfigured, the VDBDS must then reprocess the input data, requiring days or weeks before the results can be visualized.

Another significant disadvantage to the above approach is that the resulting databases do not automatically scale with hardware advancements. Modern graphics hardware performance doubles approximately every six months. In order to take advantage of the fidelity afforded by improved graphics capabilities, a database modeler must reconfigure the VDBDS to produce more detailed output. As the output detail increases, so does the time required by the VDBDS to process the source data, as well as the size of the resulting database.

Large databases tax system resources such as CPU time and disk access at run time. This limits the practical extent of databases produced using the approach described above. Furthermore, because all processing must be performed prior to run-time, the entire database must be produced offline. For large-area databases, many of the resulting database LODs may never actually be visualized and are therefore wasted. Finally, the quality of the database generated is entirely dependant upon the skill of the database modeler, making it necessary to have an expert on hand for updating the visual databases.

A method and system for generating databases used in real-time image displays is disclosed in U.S. Pat. No. 7,366,736, which is hereby incorporated by reference. This method and system is able to provide image displays from the directly from the source data at run time. While this invention removes the need to create and store large databases prior to run time and allows terrain visualization to begin soon after source data became available, it can only process data in formats that are previously identified in the original code. As a result, support cannot be added for any previously unsupported data formats by the invention without a substantial change being made to the system. Moreover, the rules controlling how the data is processed in the system are not configurable by a user, leading to further limitation in terms of the type of data that can be used.

Because of these limitations, a need exists to overcome the problems with the prior art, and particularly for a system and method that is more universal and is easily configurable to allow it to generate image displays in real time directly from any type of source data at run-time.

SUMMARY OF THE INVENTION

A method and system provides visualization of high-resolution terrain for use in real time simulation for digital image displays directly from source data (imagery, classification, elevation, and vector data) at run-time, with little or no off-line manipulation of the source data, where source data in any format can be entered into the system. This allows for any type of source data to be used as long as is contains the information required to render a visualization. Visualization of terrain can begin very soon after the source data and made available and the fidelity of the visualization is scalable based on the graphics system capabilities. Where imagery is not available, the system and method produces synthesized imagery from land classification data as well as other available worldwide data.

Readily available worldwide data exists in many different data storage formats for imagery, classification, elevation, vector, and airport runway data. Airport runway data is presently updated monthly and may contain information regarding the size, orientation, elevation, slope, markings, and lighting systems for each runway.

It is an object of this invention to provide a low cost database image generator that clearly defines which data must be loaded into the system, can allow new types and formats of data to be supported, can allow a user to configure how the data is processed by the system, and can allow a user to configure the system to interpret different data attributes.

In accordance with these and other objects which will become apparent hereinafter, the instant invention will now be described with particular reference to the accompanying drawings.

DESCRIPTION OF THE PREFERRED EMBODIMENTS

Figure 1:
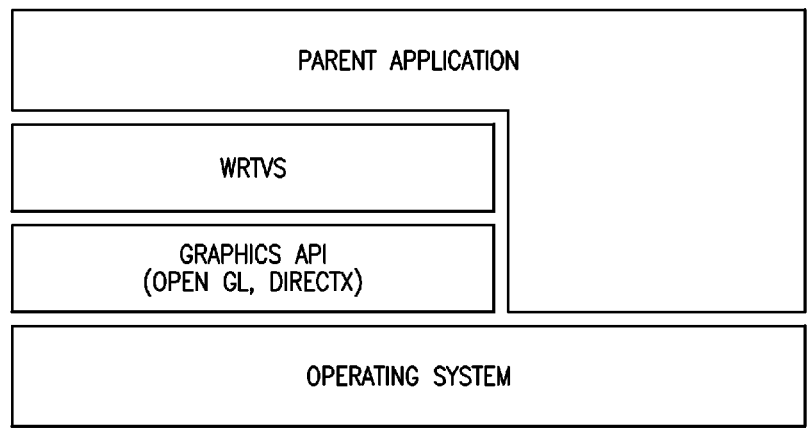
FIG. 1 shows a schematic diagram of the invention.
Figure 2:
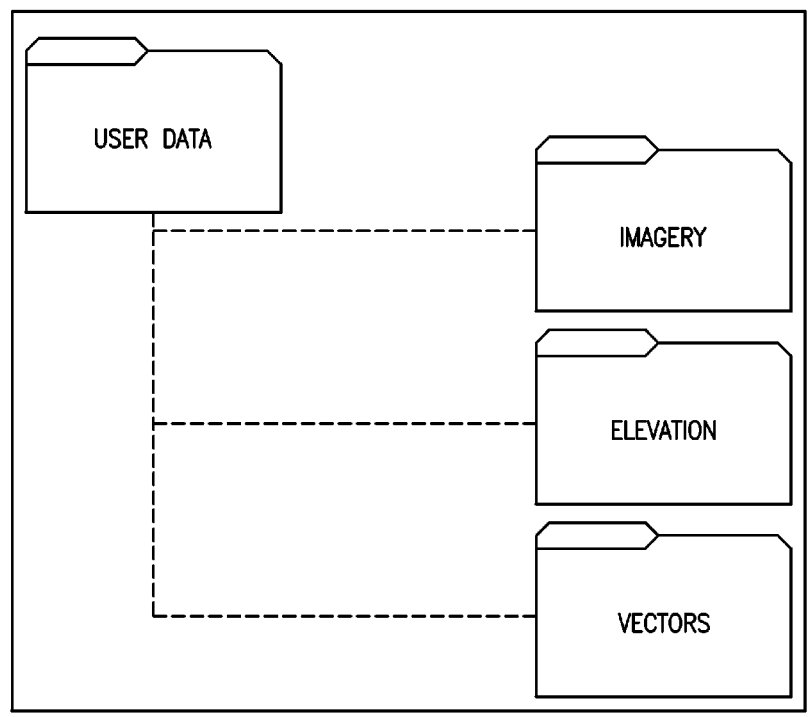
FIG. 2 shows a schematic diagram of a data directory hierarchy.

The present invention, according to a preferred embodiment, overcomes problems with the prior art by improving the software library here called the Worldwide Runtime Terrain Visualization System (WRTVS) so that it more clearly defines which data is loaded into the system, can more easily allow new types of data to be supported, allows users to configure how the data is processed by the system, and allows the user to configure the system to interpret different data attributes. Referring now to FIG. 1, as a software library, the WRTVS is utilized by a parent application which communicates to the WRTVS required information (such as the current latitude, longitude, and view orientation) via function calls. The WRTVS then utilizes a common graphics API (e.g., OpenGL or DirectX) to communicate with the graphics card in the operating system to display the terrain in the region of interest. By default, the WRTVS utilizes an included worldwide data set derived from freely available sources for terrain visualization. Furthermore, the WRTVS can utilize high resolution source data with minimal requirements for manual data preparation.

Today, there are numerous worldwide datasets that are freely available. This data includes imagery, classification, elevation, vector, airport runway information for every known runway, and many others. The WRTVS can readily incorporate much of this available information to quickly create an accurate worldwide terrain simulation. Because there is no need to store intermediate results to disk, storage requirements are greatly reduced. The WRTVS is designed to utilize commercial off-the-shelf graphics hardware, which greatly reduces costs. Because the capabilities of the graphics hardware increase rapidly, the WRTVS provides for scalable fidelity. Therefore, as hardware capabilities increase, the fidelity of the WRTVS increases as well.

Figure 3:
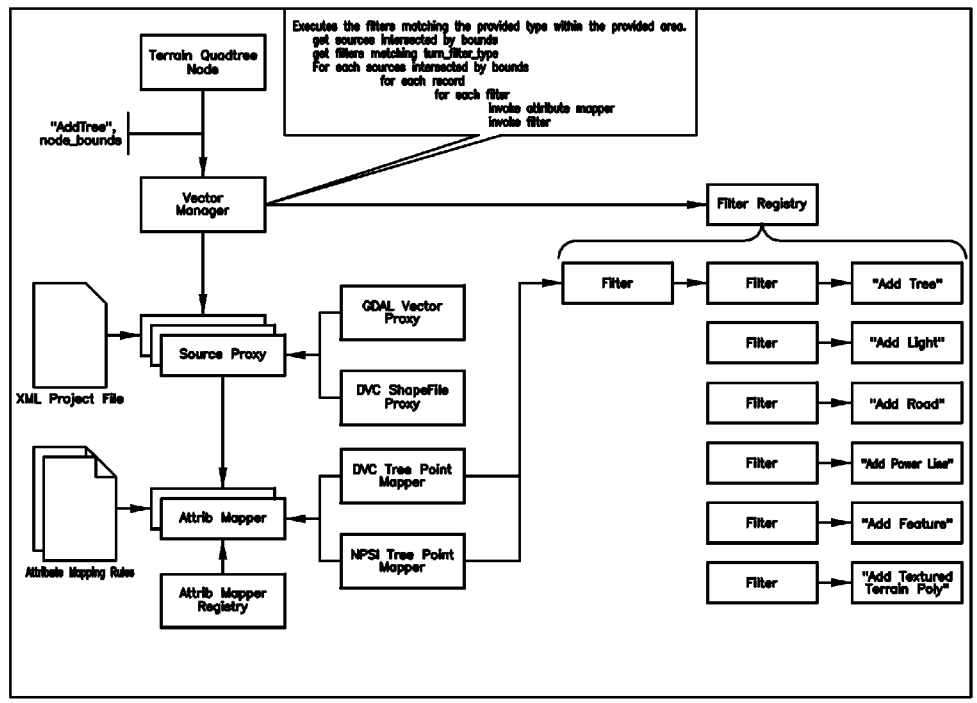
FIG. 3 show a flow chart of the data processing structure.

Referring now to FIG. 3, a data processing flow chart is shown. In order to facilitate run-time processing of source data, the system utilizes a project file which lists each source file, along with metadata such as spatial extents, desired attribute mapping, and whether or not a source is enabled or disabled. The project file ideally is in XML format and contains a schema for validating the contents of the file. The project file replaces the need to have the system traverse a rigid directory hierarchy on initialization.

For each source file listed in the project file, a source proxy object is created in memory which references the target source file and provides access to it. There is a unique type of source proxy for each data format (including but not limited to Shapefile, VMAP, and VPF) which knows how to load the vector records out of its respective format. These source proxy objects are then stored in a Vector Manager in a spatial index so the WRTVS can quickly determine which data sources intersect a given area.

A spatial index is a data structure that orders data based on its spatial information to allow quick access to the data based on its location. Examples of such structures are quad-trees, R-trees and kd-trees. The WRTVS utilizes a generic spatial data structure that allows any type of data to be indexed using the desired indexing strategy with the requirement that the data has spatial information. In the WRTVS, each spatial index can be queried for the proxies covering a requested geographic area. The resulting proxies can then be accessed for the data within the query boundary.

Once a source proxy has been created for a given source file, the system determines how attributes should be mapped from the source into what the internal algorithms need to process the data. Each attribute mapper defines which attributes it requires, along with a list of optional attributes that it can use, with default values for optional attributes. The attribute mappers are configured with a GUI, resulting in an XML file that lists all of the options for the attribute mapper. This XML file is loaded by the system to prepare the attribute mappers for run-time processing. When a source proxy is made for a given source file, it is consulted for the attributes it contains. The attribute mappers are then consulted to determine which attribute mapper can interpret the data, and the best match is assigned to the proxy.

As there are many different attribution schemes in use in simulation, GIS, and other industries, it would be impractical for the system to have a single attribute mapper which can use any attribution mapping scheme. As a result, the system is capable of using different attribute mappers, depending on the attribution scheme, in order to properly map the attributes and allow the data to be processed. To accomplish this, the system contains attribute mappers to support several common mapping schemes and can be configured to allow a user to define a custom attribute mapper to support any other desired mapping scheme.

With data sources well defined along with a mechanism to interpret the attributes contained within each data source, the system is ready to define how the data can be processed. This is accomplished using filter chains. A filter takes data as an input and performs a predefined function on the input to produce an output. A filter chain comprises one or more filters, wherein the first filter in the filter chain takes a record from a vector source as an input, performs the filter's function, and sends the output to the next filter in the chain, wherein said output becomes the next filter's input. This process continues until the filter chain ultimately ends with a terminating filter, which produces a result which is added to the scene imagery. The system allows a user to define the filter chains in a GUI that exports an XML description that the system will load and use to configure the actual filter chain. The following is an exemplary list of filters used by the system:

LinearSimplificationFilter
PolygonSimplificationFilter
PolygonPointScatterFilter
EliminatePointInPolyFilter
SlopePointFilter
AddSprite (terminating filter)
ScatterSpritesInPoly (terminating filter)
ScatterSpritesAlongLine (terminating filter)
AddLightPoint (terminating filter)
AddLightPool (terminating filter)
ScatterLightsInPoly (terminating filter)
ScatterLightsAlongLine (terminating filter)
AddFeature (terminating filter)
ScatterFeaturesInPoly (terminating filter)
ScatterFeaturesAlongLine (terminating filter)
AddTerrainTexturePolygon (terminating filter)
AddTerrainGeometrPolygon (terminating filter)
AddWaterRegion (terminating filter)
AddPowerLine (terminating filter)
AddWall (terminating filter)

AddExtrudedBuilding (terminating filter)
AddRoadSegment (terminating filter)
AddTrafficString (terminating filter)
FlattenElevation (terminating filter)
AddRunway (terminating filter)
AddTaxiSign (terminating filter)

Figure 4:
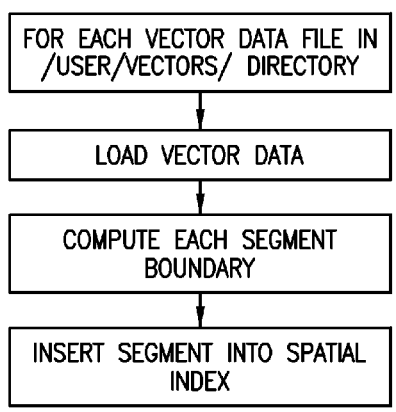
FIG. 4 shows a flow chart for the vector processing in accordance with the invention.

FIG. 4 shows vector processing. Vector data representing roads and water boundaries is loaded at initialization. For each vector segment, its boundary is computed and it is placed into a spatial index.

Because the WRTVS spatially indexes geo-referenced data automatically at load time, the user is free to structure each type of geo-referenced source data in a logical hierarchy rather than a spatial hierarchy. This greatly simplifies data management because data can be structured in a human-understandable manner, thereby lessening the labor required by the user. Because querying a file's geo-referencing requires minimal disk access, the construction of each spatial index is performed rapidly, allowing for data with world-wide coverage to be indexed at load time. While the spatial indexing of user data does happen upon system initialization, if new data becomes available during run time, the WRTVS can be prompted to re-index newly available data and regenerate the terrain in effected areas.

Figure 5:
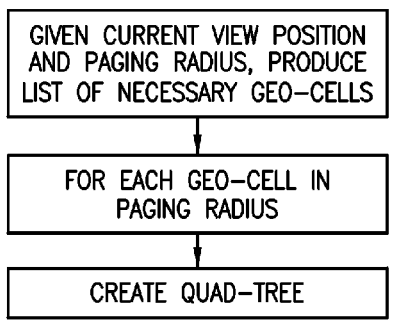
FIG. 5 shows geo-cell creation in a flow chart.

Referring now to FIG. 5, at run-time, the parent application provides information regarding the desired view position and orientation to the WRTVS. Given the world position and a visibility range, the WRTVS calculates the geo-cells required for visualization. A geo-cell is defined as a 1 degree by 1 degree region. At the equator, a geo-cell is approximately 60 nautical miles by 60 nautical miles. For each geo-cell, the WRTVS utilizes the view position to generate a quad-tree terrain hierarchy. Each node in the quad-tree performs queries into the various spatial indexes to determine what user-provided data exists within the node boundary. These queries are processed asynchronously in parallel execution threads to prevent delays caused by expensive disk access operations from affecting the performance of the parent application. While quad-trees are quite common in terrain visualization, the mechanisms used by the WRTVS for the composition of each node happen entirely at run time directly from source data.

Figure 6:
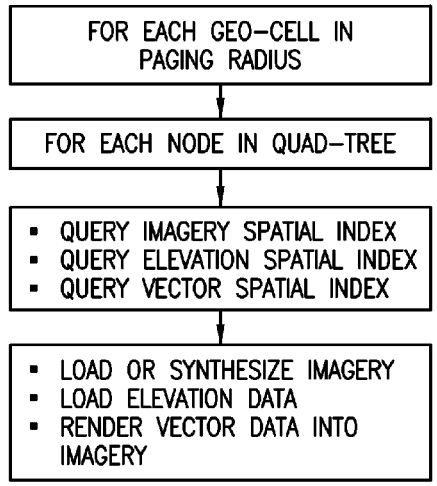
FIG. 6 shows run-time processing in a flow chart.
Figure 7:
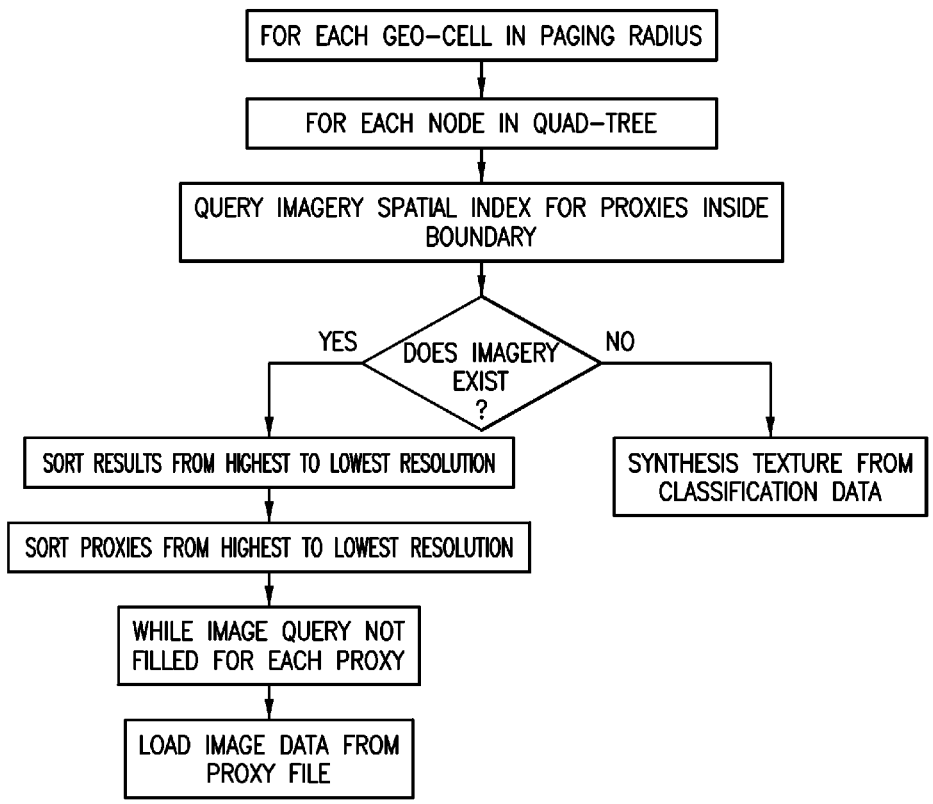
FIG. 7 shows a flow chart for the image processing.

Referring to FIG. 6 and FIG. 7, the run-time processing of imagery queries works as follows. For each node in the terrain quad-tree, a query is constructed defining the extent of the node's geographic coverage. The query contains a temporary 2-D memory buffer of user-defined dimension, utilized for storing the resulting combined image. The imagery spatial index utilizes this query to traverse the proxy hierarchy constructed at initialization. Proxies which have spatial extents that fall inside of or intersect the query boundary are added to a list of candidate proxies to be processed. The proxy list is then sorted from highest resolution to lowest. Each proxy is then queried for the data within the region of interest. This causes the imagery data file represented by the proxy to be accessed and the data within the region to be loaded into the query's temporary image buffer, combining it with previously processed proxy results. After each proxy has been processed, a check is made to determine if the query region has been filled. Once the query region has been filled, proxy processing ceases so that low-resolution data is not loaded if it is completely covered by high-resolution data within the query region. The result is that the highest-resolution data has priority. The resulting combined image buffer is then loaded into graphics memory as a texture for rendering.

In regions that are not intersected by user-provided imagery, texture synthesis is utilized to provide an approximated rendering of the terrain based on land classification data, hydrographic vectors, road vectors, and other sources, allowing for seamless global coverage.

The run-time processing of elevation queries works as follows. For geo-cells which are within the paging radius, the file system is searched in an asynchronous processing thread for available DTED (Digital Terrain Elevation Data) files. If multiple DTED files are found for a given geo-cell, the one with the highest resolution is selected. If no DTED files are found for a give geo-cell, the default elevation data provided with the WRTVS is loaded. Once the elevation data is loaded, normal vectors are computed for terrain lighting. The elevation data is then spatially indexed so that elevation queries are performed rapidly.

Once the elevation data for a geo-cell has been indexed, the terrain quad-tree is constructed. For each node in the tree, the index is queried for elevations falling on a 2-D grid with user-defined dimensions. The elevation is computed by performing a bilinear interpolation of surrounding elevation values. The elevation values are then loaded into graphics memory for rendering.

The vector spatial index is queried at run time for the vectors that fall within each terrain quad-tree node. These resulting vectors are rasterized into the texture image associated with the quad-tree node. Because the vectors are rasterized into the texture image, subsequent rendering of the data only requires rendering of the texture image rather than the individual vectors. This significantly reduces the cost of rendering complex scenes.

Figure 8:
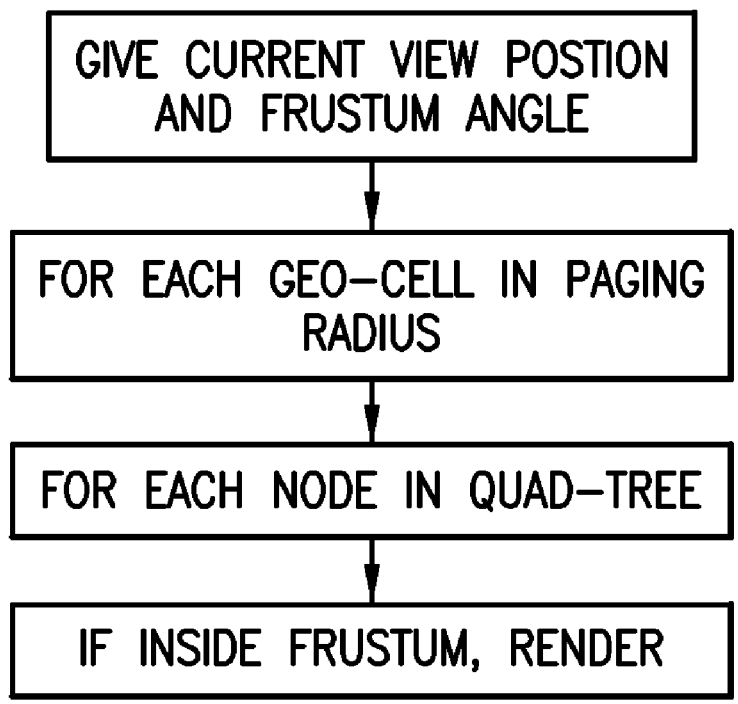
FIG. 8 shows a flow chart for image rendering.

Referring now to FIG. 8, rendering is shown. After the imagery, elevation and vector data for a quad-tree node have been processed and loaded into graphics memory, the nodes that are intersected by or fall within the viewing frustum are displayed. This is accomplished by rendering a mesh of triangles with vertices co-incident with the elevation samples returned by the elevation query. The triangle mesh is mapped with the texture resulting from the imagery query and/or texture synthesis.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. In a method of database generation for generating data images in a display in real-time, the method to facilitate one-time processing of source data including the steps of:

(a) providing a project file which lists each source file, desired attributes mapping and whether or not a source is enabled or disabled;

(b) providing for each source file listed in the project file a source proxy object in memory referencing the target source file and access thereto;

(c) storing the source proxy objects in a vector management in the spatial index to quickly determine which data sources intersect a given area;

(d) determining how attributes should be mapped once a source proxy has been created for a given source file into what internal algorithms need to process the data;

(e) providing attribute maps to support several common mapping schemes that can be configured to allow a user to define a custom attribute map; and (f) defining how the data can be processed using filter chains comprising one or more filters when the first filter in the filter chain takes a record from a vector source as an input, performs the filters function and sends the output to the next filter in the chain, which is continued until the filter chain ends with a terminating filter which produces a result which is added to the scene imagery.

2. The method of claim 1 that includes the following steps of:
  (a) providing an input from a parent application that sends latitude, longitude and observer location information for the image to be generated;
  (b) providing a simulator display having an advanced graphic card connected to the display for producing real-time terrain images on the display;
  (c) providing a software library that is connected to the output of the parent application to provide current latitude, longitude and observer view orientation to the software library using function calls;
  (d) connecting the output of the software library to graphics API to communicate with the graphics card to display terrain images in a region of interest;
  (e) using and including a worldwide data set derived from freely available sources for terrain visualization in said software library, said data including imagery, elevation, and vector data; and
  (f) organizing user data in said library into a data hierarchy that includes user data derived from imagery data, elevation data and vector data.

* * * * *